United States Patent
Clemens et al.

(10) Patent No.: US 9,982,697 B2
(45) Date of Patent: May 29, 2018

(54) FASTENING ELEMENT FOR ATTACHING TO A WALL

(71) Applicant: SULZER MIXPAC AG, Haag (CH)

(72) Inventors: Victor Clemens, Bregenz (AT); Sebastian Paus, Rebstein (CH)

(73) Assignee: SULZER MIXPAC AG, Haag (CH)

( * ) Notice: Subject to any disclaimer, the term of this patent is extended or adjusted under 35 U.S.C. 154(b) by 303 days.

(21) Appl. No.: 14/777,598

(22) PCT Filed: Mar. 6, 2014

(86) PCT No.: PCT/EP2014/054351
§ 371 (c)(1),
(2) Date: Sep. 16, 2015

(87) PCT Pub. No.: WO2014/146907
PCT Pub. Date: Sep. 25, 2014

(65) Prior Publication Data
US 2016/0273565 A1 Sep. 22, 2016

(30) Foreign Application Priority Data
Mar. 20, 2013 (EP) ..................................... 13160082

(51) Int. Cl.
*F16B 11/00* (2006.01)
*B29C 65/54* (2006.01)
(Continued)

(52) U.S. Cl.
CPC ............ *F16B 11/006* (2013.01); *B29C 65/54* (2013.01); *B29C 66/342* (2013.01);
(Continued)

(58) Field of Classification Search
None
See application file for complete search history.

(56) References Cited

U.S. PATENT DOCUMENTS 3,482,809 A * 12/1969 McCall, Jr. ............... F16L 3/00
248/205.1
3,504,878 A * 4/1970 Dressler ............ A47G 25/0607
211/105.1
(Continued)

FOREIGN PATENT DOCUMENTS

DE 1731231 U * 10/1956
DE 3034101 C2 1/1986
(Continued)

OTHER PUBLICATIONS

Machine Translation for JP 2007209923 A, Aug. 2007.*
Machine Translation for DE 102008058389 A1, May 2010.*

*Primary Examiner* — Jeffrey A Vonch
(74) *Attorney, Agent, or Firm* — Global IP Counselors, LLP

(57) ABSTRACT

A fastening element for attaching to a wall. The fastening element having a contact element having an adhesive surface and a filling opening via which a flowable adhesive agent is capable of being brought between the adhesive surface and the wall. Positioning elements by which the contact element is capable of being positioned at the wall are arranged at the adhesive surface. The positioning element has a width which is variable in dependence on a spacing from the outlet opening. The width reduces at least sectionally as the spacing from the outlet opening increases and is minimal at a maximum spacing from the outlet opening. Accordingly, the adhesive surface is capable of flowing around the positioning element on the introduction between the wall and the adhesive surface.

16 Claims, 3 Drawing Sheets

(51) Int. Cl.
  *B29C 65/00* (2006.01)
  *B29C 65/48* (2006.01)
  *B29C 65/50* (2006.01)
  *B29C 65/52* (2006.01)

(52) U.S. Cl.
  CPC ........ *B29C 66/474* (2013.01); *B29C 65/4805* (2013.01); *B29C 65/5057* (2013.01); *B29C 65/5078* (2013.01); *B29C 65/522* (2013.01); *B29C 65/542* (2013.01); *B29C 65/546* (2013.01); *B29C 66/02* (2013.01); *Y10S 248/00* (2013.01); *Y10T 428/218* (2015.01); *Y10T 428/24008* (2015.01); *Y10T 428/24182* (2015.01); *Y10T 428/24273* (2015.01); *Y10T 428/24281* (2015.01); *Y10T 428/24479* (2015.01); *Y10T 428/28* (2015.01)

(56) References Cited

U.S. PATENT DOCUMENTS

| | | | | |
|---|---|---|---|---|
| 3,532,316 A | * | 10/1970 | Gunther | B01F 5/0646 156/242 |
| 4,302,492 A | | 11/1981 | Hutter, III | |
| 4,338,151 A | | 7/1982 | Hutter, III | |
| 4,389,035 A | * | 6/1983 | Freeman | E04B 2/82 248/205.3 |
| 4,390,576 A | | 6/1983 | Hutter, III | |
| 4,668,546 A | | 5/1987 | Hutter, III | |
| 4,778,702 A | * | 10/1988 | Hutter, III | B29C 65/0672 156/247 |
| 4,822,656 A | | 4/1989 | Hutter, III | |
| 4,932,805 A | * | 6/1990 | Mullen | B41J 29/02 403/13 |
| 5,065,489 A | * | 11/1991 | Mullen | B23Q 1/0063 29/281.5 |
| 5,232,962 A | * | 8/1993 | Dershem | C09J 5/00 257/E21.503 |
| 5,593,120 A | * | 1/1997 | Hamerski | B29C 65/0672 156/235 |
| 7,815,988 B2 | | 10/2010 | Stumpf et al. | |
| 2005/0012002 A1 | | 1/2005 | Ortwein | |
| 2008/0102249 A1 | * | 5/2008 | Ristoski | B60K 15/03177 428/138 |
| 2009/0081464 A1 | * | 3/2009 | Summersgill | B29C 39/10 428/411.1 |
| 2012/0121855 A1 | * | 5/2012 | Dai | C09J 5/00 428/138 |
| 2013/0181102 A1 | * | 7/2013 | Tooley | A47B 96/06 248/205.3 |
| 2013/0206335 A1 | * | 8/2013 | Renius | C09J 5/00 156/305 |
| 2014/0265160 A1 | * | 9/2014 | Holcomb | F16J 15/02 277/637 |

FOREIGN PATENT DOCUMENTS

| | | | | |
|---|---|---|---|---|
| DE | 4416884 A1 | * | 11/1995 | ............ B29C 65/54 |
| DE | 4427951 C1 | * | 3/1996 | ............ A47G 1/17 |
| DE | 102006012411 A1 | | 4/2007 | |
| DE | 102006010392 A1 | * | 9/2007 | ............ A47K 10/10 |
| DE | 102008058389 A1 | | 5/2010 | |
| EP | 0823561 A1 | * | 2/1998 | ............ B29C 65/54 |
| EP | 902199 A1 | * | 3/1999 | |
| EP | 922981 A2 | * | 6/1999 | |
| EP | 1396385 A1 | * | 3/2004 | ............ B60R 11/02 |
| JP | 10002760 A | * | 1/1998 | |
| JP | 2003154311 A | * | 5/2003 | |
| JP | 2007209923 A | * | 8/2007 | |
| WO | 01081774 A1 | | 11/2001 | |
| WO | 2010057881 A1 | | 5/2010 | |

* cited by examiner

FASTENING ELEMENT FOR ATTACHING TO A WALL

CROSS-REFERENCE TO RELATED APPLICATIONS

This application is a U.S. National stage application of International Application No. PCT/EP2014/054351, filed Mar. 6, 2014, which claims priority to EP Application No. 13160082.7, filed Mar. 20, 2013, the contents of each of which is hereby incorporated herein by reference.

BACKGROUND

Field of Invention

The invention relates to a fastening element for attaching to a wall.

Background Information

A fastening element for attaching to a wall is described in U.S. Pat. No. 4,822,656. The fastening element has a holder element in the form of a pin which has an external thread. An object can be fastened to the fastening element and thus to the wall via the holder element. The fastening element moreover has a contact element having an adhesive surface. An adhesive agent is applied to the adhesive surface prior to the attachment to the wall. An installation frame into which the fastening element is inserted is subsequently positioned at the wall by positioning elements in the form of adhesive strips, with there not yet being any contact between the adhesive agent and the wall. The fastening element is then brought into a press-on position within the installation frame in which contact position the adhesive surface together with the adhesive agent is pressed against the wall. The installation frame is removed and disposed of after the hardening of the adhesive agent.

A fastening element for attaching to a wall is described in WO 01/81774 A1 in which no installation frame is required. It likewise has a holder element for holding an object. It has a contact element having an adhesive surface and a rear side and a filling passage which leads from the rear side of the contact element to an outlet opening in the adhesive surface of the contact element. A flowable adhesive agent can be introduced between the adhesive surface and the wall via the filling passage for attaching the fastening element to the wall. The contact element, and thus the fastening element, is positioned at the wall by a positioning element in the form of a double-sided adhesive tape before the introduction of the adhesive element.

WO 01/81774 A1 does not make any statement on the design or shape of the positioning element. Trials have shown that when commercial adhesive strips in rectangular form (if the thickness of the adhesive strip is neglected) are used, an uneven distribution of the adhesive agent between the adhesive surface and the wall arises. This in turn has the result that the adhesive surface, and thus the fastening element, are not ideally fastened to the wall.

SUMMARY

In the light of this, it is in particular the object of the invention to propose a fastening element which can be attached to a wall without the use of an installation frame and which nevertheless allows a very good adhesion to the wall. In accordance with the invention, this object is satisfied by a fastening element having the features described herein.

The fastening element in accordance with the invention for attaching to a wall has a holder element for holding an object, a contact element having an adhesive surface and a rear side and a filling passage which leads from the rear side of the contact element to an outlet opening in the adhesive surface of the contact element. A flowable adhesive agent can be brought between the adhesive surface and the wall via the filling passage. The fastening element moreover has a positioning element by which the contact element can be positioned at the wall. "Positioning" is to be understood in this connection such that the fastening element is positioned and thus (pre-)fastened to the wall before the final attachment at a desired position.

In accordance with the invention, the positioning element has a width which is variable in dependence on a spacing from the outlet opening. The width of the positioning element results from an extent parallel to the adhesive surface and perpendicular to a direction of flow from the outlet opening through a center of area of the positioning element. The width reduces at least sectionally as the spacing from the outlet opening increases and is minimal at a maximum spacing from the outlet opening. The width at the maximum spacing is in this respect minimal at least with respect to the section with reducing width toward the maximum spacing. It is possible that the positioning element also has a smaller width than at the maximum spacing in another section which is closer to the outlet opening.

It is thus achieved that the adhesive agent can flow very easily around the positioning element on the introduction between the wall and the adhesive surface and regions do not result behind the positioning element viewed in the direction of flow into which no or comparatively little adhesive agent arrives. The embodiment of the positioning element in accordance with the invention thus makes it possible that the complete region between the adhesive surface and the wall can be filled uniformly with adhesive agent with the exception of the positioning element and thus an ideal adhesion of the fastening element to the wall is ensured. The quantity of adhesive agent which oozes out unused from the intermediate space between the adhesive surface and the wall is moreover very small due to the easy flowing around of the adhesive agent.

The holder element and the contact element are manufactured from metal or plastic, for example, and are fixedly connected to one another. The connection can be established, for example, by adhesive bonding or by welding, in particular friction welding. It is also possible that the holder element and the contact element are made in one piece. This is in particular advantageous when the elements are composed of plastic. In this case, they can be manufactured using an injection molding process.

A "wall" is to be understood as a surface at which an object, for example a hook, a panel or similar can be fastened. The wall is in particular designed at least regionally as planar. It is, however, possible that the wall is designed as curved. In addition, the wall can also have two or three part surfaces, in particular planar part surfaces, which are arranged at an angle with respect to one another of in particular 90°. The contact element and thus the adhesive surface then in particular have a shape corresponding to the contour of the wall. The adhesive surface can then in particular be made from a first adhesive part surface, a second adhesive part surface and possibly a third adhesive part surface which are arranged at an angle with respect to one another of 90°, for example. The adhesive part surfaces are in particular designed as planar surfaces. Slight differences between the contour of the wall and the shape of the adhesive surface can also be compensated by the adhesive agent. The wall can, for example, be part of a building, of a vehicle or of an aircraft. The wall can in particular be designed as part of an aircraft at which an inner panel is mounted by fastening elements in accordance with the invention.

In the geometrical definition and description of the positioning element, a thickness of the positioning element, that is an extent perpendicular to the adhesive surface, and thus also perpendicular to the wall, is neglected. The positioning element is considered in simplified terms as a two-dimensional surface which is aligned parallel to the wall and to the adhesive surface. The positioning element thus has a center of area which is used for defining the direction of flow. The center of area can as in general be determined by geometrical considerations or by integration. It can also be determined purely mechanically by balancing a homogeneous body with the corresponding shape and constant thickness and density. With axially symmetrical surfaces having at least two axes of symmetry, the center of area lies at the point of intersection of the axes of symmetry.

Reference is also made to the outlet opening in the defining of the direction of flow. In this connection, the outlet opening is only understood as its center, that is its center of area. With a circular outlet opening, this is the center of the cross-sectional surface.

The named rear side of the contact element from which the filling passage leads to the outlet opening is characterized in that it is not part of the adhesive surface and is still accessible after the positioning of the fastening element at the wall. It can, but does not have to be designed as parallel to the adhesive surface.

A two-component adhesive, in particular an epoxy adhesive, can be used as the adhesive agent, for example.

The positioning element in particular adopts a surface portion between 3 and 20%, preferably between 5 and 10%, of the adhesive surface. A very good compromise thus results between the remaining surface which is available for the adhesive agent and thus for the permanent fastening and a holding force of the positioning element after the positioning of the fastening element to the wall and thus on the filling in of the adhesive agent.

In an embodiment of the invention, the positioning element is arranged such that its center of area lies in a range from 20 to 70% of a total flow path of the adhesive agent. The regional indication in this respect is with reference to starting from the outlet opening. A particularly advantageous flowing around of the positioning element and thus a particularly good and uniform of the adhesive agent is thus made possible. A total flow path is to be understood in this respect as the path in the direction of flow from a margin of the outlet opening in the direction of the positioning element up to a margin of the adhesive surface.

In an embodiment of the invention, the positioning element is arranged so that a free flow path of the adhesive which amounts to at least 20% of the total flow path of the adhesive agent results both between the outlet opening in the adhesive surface of the contact element and the positioning element and also between the positioning element and a margin of the adhesive surface of the contact element. This, on the one hand, makes it possible that the adhesive agent can distribute easily after the exiting of the outlet opening and, on the other hand, that the two part flows of the adhesive agent resulting in the flowing around of the positioning element can recombine after the positioning element and so no regions without adhesive agent arise between the adhesive surface and the wall. A particularly good and uniform distribution of the adhesive agent is thus made possible, which results in a particularly stable fixing of the fastening element to the wall.

In an embodiment of the invention, the positioning element has a length which results from an extent in the direction of flow. A ratio of length to maximum width of the positioning element is larger than 1:1. The named ratio is particularly preferably between 2 and 3. A particularly advantageous flowing around of the positioning element is thus made possible.

In an embodiment of the invention, the width of the positioning element first increases starting from a minimal spacing from the outlet opening up to the reaching of a maximum width in order then to reduce again and to be minimal at the maximum spacing from the outlet opening. A particularly advantageous flowing around of the positioning element is thus made possible.

In an embodiment of the invention, the positioning element has at least one axis of symmetry. A longest axis of symmetry includes an angle y of a maximum of 60°, in particular a maximum of 45°, with the direction of flow. Larger angles y would prevent a flowing around of the positioning element.

The positioning element is in particular made as ellipsoid or as diamond-shaped. It can also have a shape which results from two arcs, in particular two arcs of a circle. In this connection, an arc is understood as a line curved in any desired form toward one side. These shapes allow a particularly advantageous flowing around of the positioning element.

In an embodiment of the invention, the positioning element has a thickness between 0.05 and 3.00 mm, in particular between 0.1 and 0.5 mm. A correspondingly thick layer of adhesive agent can thus form between the adhesive surface and the wall, which allows a particularly good fixing of the fastening element to the wall.

In an embodiment of the invention, the positioning element has a pressure sensitive adhesive. A pressure sensitive adhesive is to be understood as an adhesive which remains highly viscous and permanently sticky after application to a carrier material and can then be applied to a substrate by pressure and remains stuck there. The positioning element can, for example, be designed as a double-sided adhesive tape. The positioning element can thus be handled particularly easily. In addition, a starting material with a pressure sensitive adhesive is inexpensive and a wide selection is available on the market. The individual positioning elements can in particular only be covered by a single masking film after the attachment to the adhesive surface. A particularly simple handling is thus possible. In addition, the masking film can have a projecting tab by which the masking film can in particular also be pulled off with gloves.

In an embodiment of the invention, the positioning element is designed as sprayable. The positioning element is then in particular applied to the adhesive surface in that a spray adhesive having a pressure sensitive adhesive is sprayed onto the adhesive surface. To ensure the desired shape of the positioning element, a stencil is in particular used which covers all regions of the adhesive surface except for the region intended for the positioning element. The positioning element can thus be applied very simply and fast and so inexpensively to the adhesive surface. This is in particular advantageous when not only one, but rather a plurality of positioning elements are provided. They can all be applied together in only one workstep. The positioning elements have in particular already been applied to the wall some time before the attachment of the fastening element to the wall and have been covered by a masking film. In this case, in particular only one masking film is used for all positioning elements of an adhesive surface. The fastening element can thus be prepared very fast and simply for the attaching to the wall by pulling off this one masking film.

In an embodiment of the invention, the fastening element has a plurality of positioning elements which are in particular distributed uniformly around the outlet opening. A secure positioning of the fastening element and also a uniform distribution of the adhesive agent is thus made possible.

In an embodiment of the invention, the holder element has a predominantly hollow-cylindrical shape and forms a first part of the filling passage. A particularly simple structure of the fastening element is thus made possible. To hold an object, the holder element in particular has an external thread which can cooperate with a corresponding internal thread of the object. Other holder types are, however, also possible such as a snap-in connection or a click connection.

In an embodiment of the invention, the contact element is designed as a circular disk through whose central axis a second part of the filling passage extends which ends at the outlet opening. This allows a simple and inexpensive structure of the fastening element. In addition, this shape makes it possible that a quantity of adhesive agent which is as small as possible is sufficient to fill up the total region between the adhesive surface and the wall. This is in particular achieved in that the total flow path is the same in all directions. The contact element in particular has a diameter of 2 to 6 cm. Smaller or larger diameters are, however, also possible depending on the application case.

It is also possible that the contact element does not have an exactly circular outer contour, but is rather slightly "flattened" in the regions in which positioning elements are arranged. Since the adhesive agent is slowed down by the positioning element on the introduction between the adhesive surface and the wall, it can thus be achieved that the adhesive agent reaches the margin at the total outer contour without passing over the margin at any point. It can thus be achieved that a minimal quantity of adhesive agent is sufficient to fill up the total region between the adhesive surface and the wall.

Further advantages, features and details of the invention result with reference to the following description of embodiments and with reference to drawings in which elements which are the same or have the same function are provided with identical reference numerals.

DETAILED DESCRIPTION OF THE EMBODIMENTS

Figure 1:
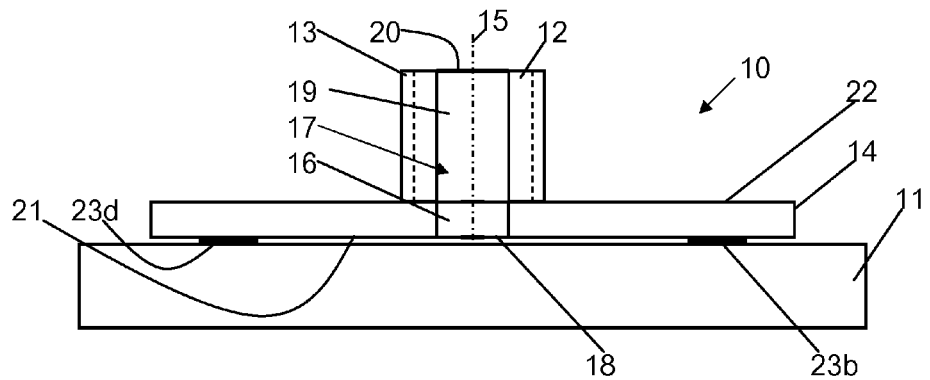
FIG. 1 is a fastening element positioned at a wall.

In accordance with FIG. 1, a fastening element 10 positioned at a planar wall 11 has a holder element 12. The holder element 12 has a predominantly hollow-cylindrical shape and has at its peripheral surface an external thread 13 which can cooperate with an internal thread of an object, not shown. The object which is not shown can, for example, be designed as a hook which can be screwed onto the holder element 12 and can thus be held at the wall 11 via the fastening element 10.

The fastening element 10 is fixedly connected to a contact element 14 by a weld connection, not shown. The two elements are produced from metal in this embodiment.

The contact element 14 is designed as a circular disk through whose central axis 15 a second part 16 of a filling passage 17 extends which ends at an outlet opening 18. The holder element 12 is arranged on the contact element 14 such that it is arranged coaxial to the central axis 15 of the contact element 14. A first part 19 of the filling passage 17 extends within the holder element 12 and ends with a filling opening 20.

The contact element 14 has a planar adhesive surface 21 which is aligned toward the wall 11 and includes the outlet opening 18 of the filling passage 17. The holder element 12 is arranged on the rear side 22 of the contact element 14 disposed opposite the adhesive surface 21. The fastening element 10 is positioned at the wall 11 and thus prefastened by a total of four positioning elements 23a, 23b, 23c, 23d, of which only two positioning elements 23b and 23d can be seen in FIG. 1. The positioning elements 23b, 23d are designed as double-sided adhesive tapes whose form will be looked at in more detail in the description of FIG. 2. The positioning elements 23a, 23b, 23c, 23d thus contain a pressure-sensitive adhesive and have a thickness of approximately 0.8 mm so that the adhesive surface 21 of the contact element 14 and the wall 11 have a spacing of approximately 0.8 mm.

A flowable adhesive agent, not shown, can be introduced between the adhesive surface 21 and the wall 11 for the final attachment of the fastening element 10 to the wall 11. The adhesive agent dries and then hardens and the fastening means or element 10 is thus fixedly connected to the wall 11.

Figure 2:
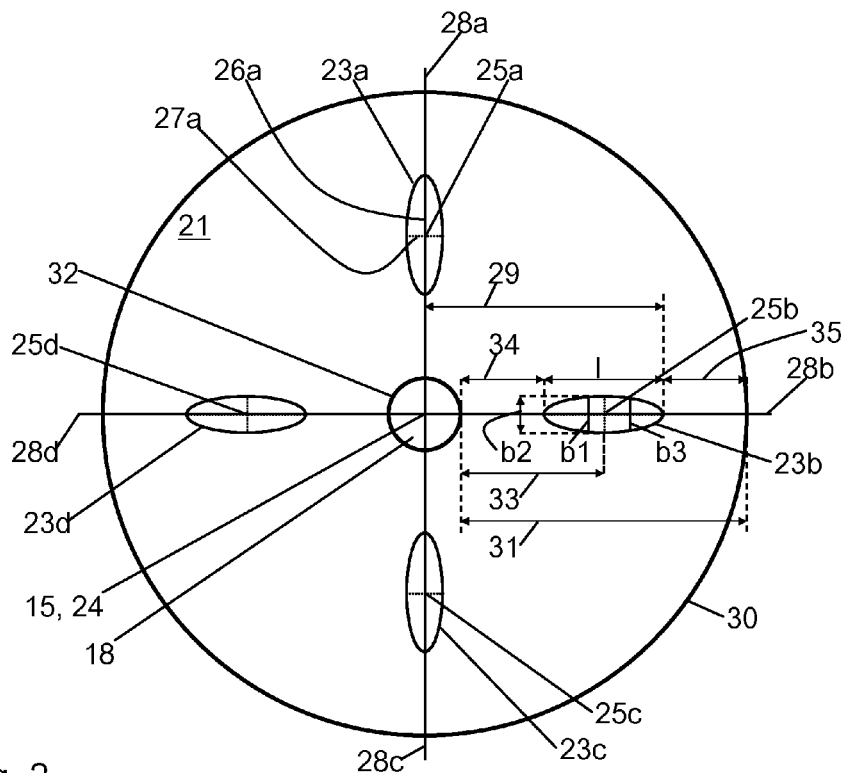
FIG. 2 is a plan view of an adhesive surface with positioning elements.

FIG. 2 shows the fastening element 10 in a view from the wall 11, that is a plan view of the adhesive surface 21 of the contact element 14 designed as cylindrical or disk-shaped with the exception of the second part 16 of the filling passage 17. The representation is in this respect not exactly to scale. The filling passage 17 is designed as cylindrical and ends with the circular outlet opening 18. The outlet opening 18 is arranged so that its center 24 lies on the central axis 15 of the contact element 14. The four positioning elements 23a, 23b, 23c, 23d are each designed as identical ellipses and are distributed uniformly around the outlet opening 18. The ellipsoid positioning elements 23a, 23b, 23c, 23d each have a long axis of symmetry and a short axis of symmetry of which only a respective one long axis of symmetry 26a and one short axis of symmetry 27a of the positioning element 23a are provided with reference numerals. The two axes of symmetry each intersect at a center of area 25a, 25b, 25c, 25d of the positioning elements 23a, 23b, 23c, 23d. A respective direction of flow 28a, 28b, 28c, 28d which extends, starting from the center 24 of the outlet opening 18, through the centers of area 25a, 25b, 25c, 25d of the positioning elements 23a, 23b, 23c, 23d thus results for each positioning element 23a, 23b, 23c, 23d. The positioning elements 23a, 23b, 23c, 23d are aligned so that the respective long axis of symmetry 26a, and thus the longest axis of symmetry, is aligned along the direction of flow 28a, 28b, 28c, 28d. A respective angle of 90° results between two adjacent directions of flow 28a, 28b, 28c, 28d due to the uniform distribution of the positioning elements 23a, 23b, 23c, 23d around the outlet opening 18.

Since all the positioning elements 23a, 23b, 23c, 23d have an identical shape and are also aligned identically with respect their respective directions of flow 28a, 28b, 28c, 28d, only the positioning element 23b will be looked at in the following, with the statements also applying to the positioning elements 23a, 23c, 23d.

The positioning element 23b has a width which is variable perpendicular to the direction of flow 28, and thus parallel to the short axis of symmetry, and which depends on a spacing from the outlet opening 18 or more exactly on the spacing from the center 24 of the outlet opening 18. Three widths b1, b2, b3 are drawn by way of example, with the first width b1 lying, viewed from the outlet opening 18, before the short axis of symmetry, the second width b2 on it and the third width b3 behind it. The width first increases constantly as the spacing from the outlet opening 18 increases and reaches the maximum width b2 at the short axis of symmetry. Subsequently, the width continuously reduces and reaches a minimal width of quasi zero at a maximum spacing 29. The positioning element 23b furthermore has a length 1 which results from an extent of the positioning element 23b in the direction of flow 28b. A ratio of length 1 to the maximum width b2 of the positioning element 23b is in this respect approximately 3 and thus larger than 1:1.

The adhesive agent is supplied via the outlet opening 18. It then flows radially outwardly up to a margin 30 of the adhesive surface 21. A total flow path 31 of the adhesive path thus results which starts at a margin 32 of the outlet opening 18 and ends at the margin 30 of the adhesive surface 21. Since both the adhesive surface 21 and the outlet opening 18 are circular, the total flow path 31 is of equal length in all directions.

The positioning element 23b is arranged such that its center of area 25b has a spacing 33 from the margin 32 of the outlet opening 18 which corresponds to approximately 62% of the total flow path 31. In addition, a first flow path 34 of the adhesive agent results between the margin 32 of the outlet opening 18 and the positioning element 23b which corresponds to approximately 29% of the total flow path 31. The first free flow path 34 simultaneously represents a minimal spacing of the positioning element 23b from the outlet opening 18. In addition, a second free flow path 35 of the adhesive agent results between the positioning element 23b and the margin 30 of the adhesive surface which likewise corresponds to approximately 29% of the total flow path 31.

Figure 3:
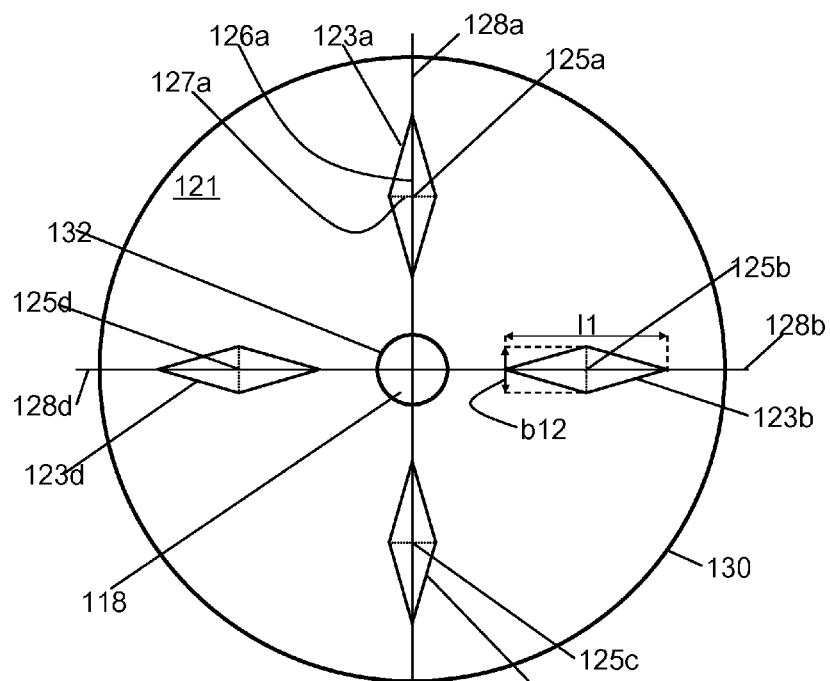
FIG. 3 is a plan view of a second embodiment of an adhesive surface with positioning elements.

In the second embodiment in accordance with FIG. 3, an adhesive surface 121 and an outlet opening 118 are identical to the embodiment in accordance with FIGS. 1 and 2. Four positioning elements 123a, 123b, 123c, 123d are arranged uniformly around the outlet opening 118. The positioning elements 123a, 123b, 123c, 123d are sprayed on in this embodiment and have a thickness of approximately 0.3 mm.

The ellipsoid positioning elements 123a, 123b, 123c, 123d each have a long axis of symmetry and a short axis of symmetry of which only a respective one long axis of symmetry 126a and one short axis of symmetry 127a of the positioning element 123a are provided with reference numerals. The two axes of symmetry each intersect at a center of area 125a, 125b, 125c, 125d of the positioning elements 123a, 123d, 123c, 123d. A respective direction of flow 128a, 128b, 128c, 128d thus results for each positioning element 123a, 121, 123c, 123d. The positioning elements 123a, 121, 123c, 123d are aligned so that the respective long axis of symmetry 126a, and thus the longest axis of symmetry, is aligned along the direction of flow 128a, 128b, 128c, 128d.

Since all the positioning elements 123a, 123b, 123c, 123d have an identical shape and are also aligned identically with respect their respective directions of flow 128a, 128b, 128c, 128d, only the positioning element 121 will be looked at in the following, with the statements also applying to the positioning elements 123a, 123c, 123d.

The positioning element 123b has a width which is variable perpendicular to the direction of flow 128b and thus parallel to the short axis of symmetry and which depends on a spacing from the outlet opening 118. The width first increases constantly as the spacing from the outlet opening 118 increases and reaches a maximum width b12 at the short axis of symmetry. Subsequently, the width continuously reduces and reaches a minimal width of quasi 0 at a maximum spacing. The positioning element 123b furthermore has a length l1 which results from an extent of the positioning element 123b in the direction of flow 128b. A ratio of length l1 to the maximum width b12 of the positioning element 123b is in this respect approximately 3.5 and thus larger than 1:1.

The positioning element 123b is arranged such that its center of area 125b has a spacing from a margin 132 of the outlet opening 118 which corresponds to approximately 50% of the total flow path. In addition, a first flow path of the adhesive agent results between the margin 132 of the outlet opening 118 and the positioning element 1233 which corresponds to approximately 21% of the total flow path. The first free flow path simultaneously represents a minimal spacing of the positioning element 123b from the outlet opening 118. In addition, a second free flow path of the adhesive agent 121 results between the positioning element 123b and a margin 130 of the adhesive surface 121 which likewise corresponds to approximately 21% of the total flow path.

Figure 4:
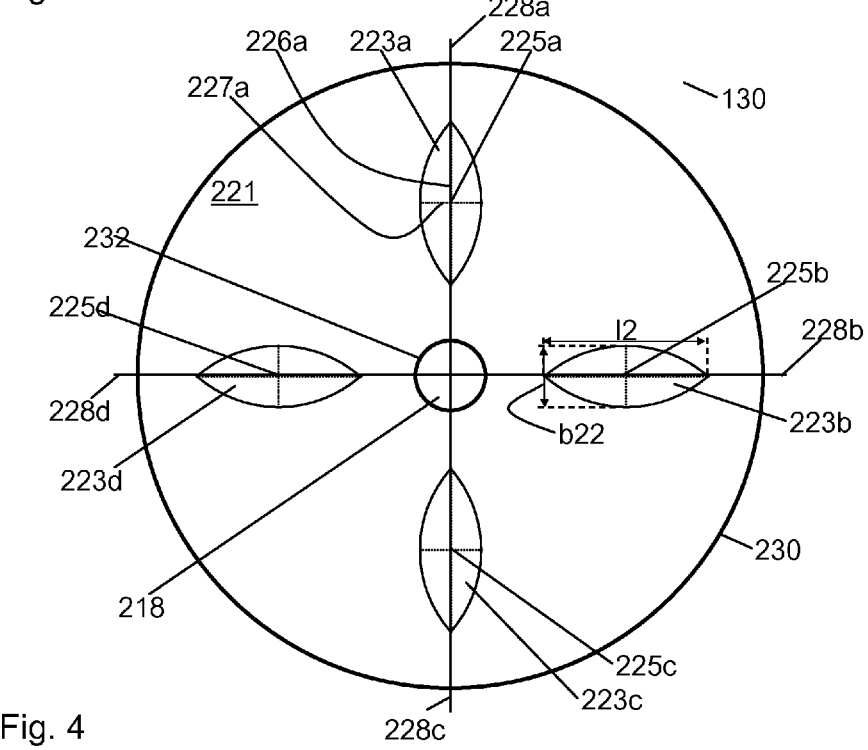
FIG. 4 is a plan view of a third embodiment of an adhesive surface with positioning elements.

In the third embodiment in accordance with FIG. 4, an adhesive surface 221 and an outlet opening 218 are identical to the embodiment in accordance with FIGS. 1 and 2. Four positioning elements 223a, 223b, 223c, 223d are arranged uniformly around the outlet opening 218.

The positioning elements 223a, 223b, 223c, 223d have a shape which results from two arcs of a circle. They each have a long axis of symmetry and a short axis of symmetry of which only a respective one long axis of symmetry 226a and one short axis of symmetry 227a of the positioning element 223a are provided with reference numerals. The two axes of symmetry each intersect at a center of area 225a, 225b, 225c, 225d of the positioning elements 223a, 223b, 223c, 223d. A respective direction of flow 228a, 228b, 228c, 228d thus results for each positioning element 223a, 223b, 223c, 223d. The positioning elements 223a, 223b, 223c, 223d are aligned so that the respective long axis of symmetry 226a, and thus the longest axis of symmetry, is aligned along the direction of flow 228a, 228b, 228c, 228d.

Since all the positioning elements 223a, 223b, 223c, 223d have an identical shape and are also aligned identically with respect their respective directions of flow 218a, 228b, 228c, 228d, only the positioning element 223b will be looked at in the following, with the statements also applying to the positioning elements 223a, 223c, 223d.

The positioning element 223b has a width which is variable perpendicular to the direction of flow 228b and thus parallel to the short axis of symmetry and which depends on a spacing from the outlet opening 218. The width first increases constantly as the spacing from the outlet opening 218 increases and reaches a maximum width b22 at the short axis of symmetry. Subsequently, the width continuously reduces and reaches a minimal width of quasi 0 at a maximum spacing. The positioning element 223*b* furthermore has a length l2 which results from an extent of the positioning element 223*b* in the direction of flow 228*b*. A ratio of length l2 to the maximum width b22 of the positioning element 223*b* is in this respect approximately 2.8 and thus larger than 1:1.

The positioning element 223*b* is arranged such that its center of area 225*a* has a spacing from a margin 232 of the outlet opening 218 which corresponds to approximately 50% of the total flow path. In addition, a first flow path of the adhesive agent results between the margin 232 of the outlet opening 218 and the positioning element 223*b* which corresponds to approximately 21%% of the total flow path. The first free flow path simultaneously represents a minimal spacing of the positioning element 223*b* from the outlet opening 218. In addition, a second free flow path of the adhesive agent results between the positioning element 223*b* and a margin 230 of the adhesive surface 221 which likewise corresponds to approximately 21% of the total flow path.

Figure 5:
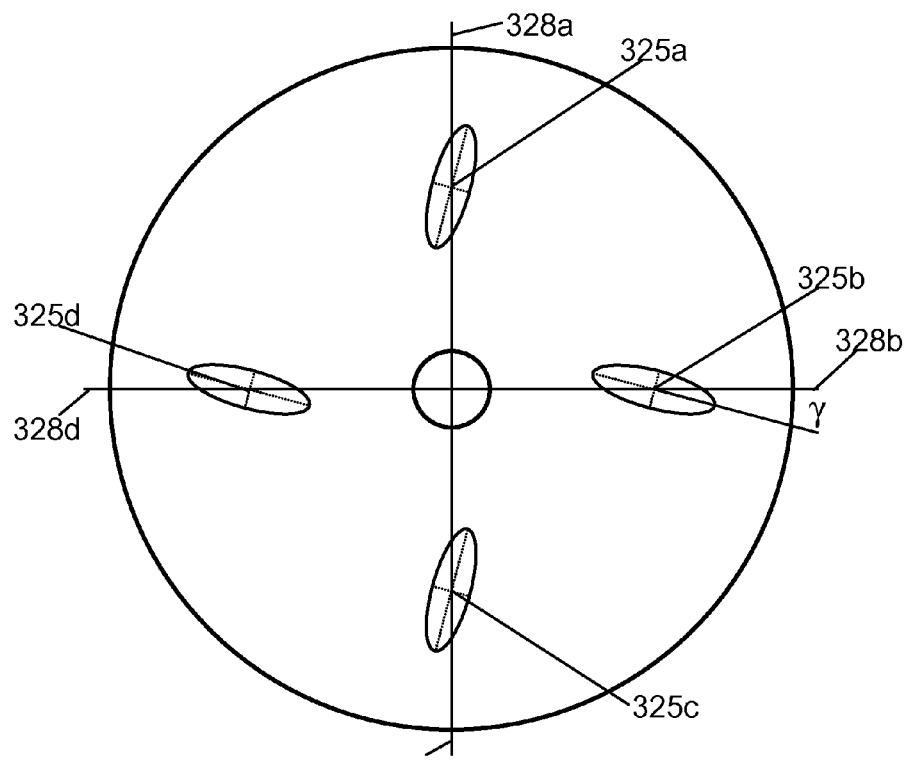
FIG. 5 is a plan view of a fourth embodiment of an adhesive surface with positioning elements.

The third embodiment in accordance with FIG. 5 differs from the embodiment in accordance with FIGS. 1 and 2 only in that the ellipsoid positioning elements 323*a*, 323*b*, 323*c*, 323*d* are rotated clockwise by a respective angle y of 15° about their respective centers of area 323*a*, 323*b*, 323*c*, 323*d*. A longest axis of symmetry 326*b* and the direction of flow 318*b* thus include an angle y of 15°.

Figure 6:
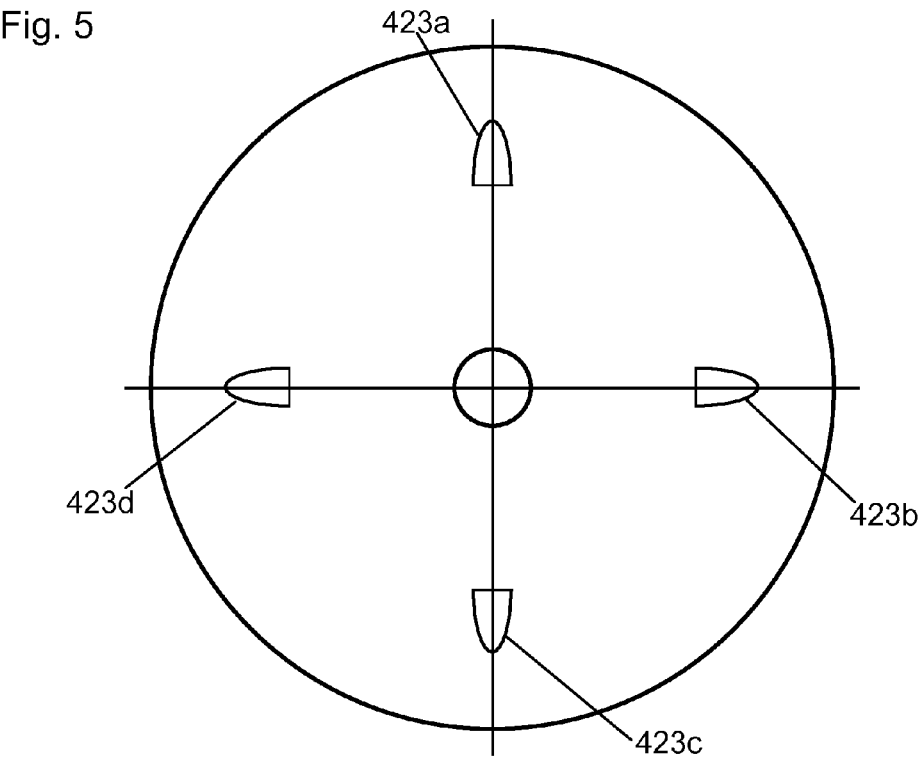
FIG. 6 is a plan view of a fifth embodiment of an adhesive surface with positioning elements.

The fourth embodiment in accordance with FIG. 6 differs from the embodiment in accordance with FIGS. 1 and 2 only in that the positioning elements 423*a*, 423*b*, 423*c*, 423*d* are designed as half-ellipses which only start at the short axis of symmetry of the associated complete ellipse.

The invention claimed is:

1. A fastening element for attaching to a wall, comprising:
a holder element configured to hold an object;
a contact element having an adhesive surface and a rear side, the holder element projecting from the rear side of the contact element, the adhesive surface configured to form a space between the adhesive surface and the wall, the space extending to a peripheral edge of the contact element so as to form an opening at the peripheral edge;
a filling passage leading from the rear side of the contact element to an outlet opening in the adhesive surface of the contact element, the outlet opening configured to open into the space between the adhesive surface and the wall and via which a flowable adhesive agent is capable of being brought between the adhesive surface and the wall; and
a plurality of positioning elements surrounding the outlet opening in the adhesive surface and enabling the contact element to be positioned at the wall, the plurality of positioning elements being configured to bring about a pre-fastening of the contact element at the wall before a final attachment at a desired position,
each of the positioning elements having a width which is variable in dependence on a spacing from the outlet opening;
the width of each of the positioning elements resulting from an extent parallel to the adhesive surface and perpendicular to a direction of flow from the outlet opening through a center of area of the positioning element;
the width of each of the positioning elements reducing at least sectionally as the spacing from the outlet opening increases, and
the width of each of the positioning elements being minimal at a maximum spacing from the outlet opening.

2. The fastening element in accordance with claim 1, wherein
the positioning elements are arranged such that a center of area thereof lies in a region from 20 to 70% of a total flow path of the adhesive agent.

3. The fastening element in accordance with claim 2, wherein
the positioning elements are arranged so that a free flow path of the adhesive agent results both between the outlet opening in the adhesive surface of the contact element and the positioning elements and between the positioning elements and a margin of the adhesive surface of the contact element which amounts to at least 20% of the total flow path of the adhesive agent.

4. The fastening element in accordance with claim 1, wherein
each of the positioning elements has a length which results from an extent in the direction of flow and a ratio of length to a maximum width of each of the positioning elements is larger than 1:1.

5. The fastening element in accordance with claim 1, wherein
the width of each of the positioning elements first increases starting from a minimal spacing from the outlet opening.

6. The fastening element in accordance with claim 1, wherein
each of the positioning elements has at least one axis of symmetry and a longest axis of symmetry includes an angle of a maximum of 60° with the direction of flow.

7. The fastening element in accordance with claim 1, wherein
each of the positioning elements is ellipsoid.

8. The fastening element in accordance with claim 1, wherein
each of the positioning elements is diamond-shaped.

9. The fastening element in accordance with claim 1, wherein
each of the positioning elements has a shape which results from two arcs.

10. The fastening element in accordance with claim 1, wherein
each of the positioning elements has a thickness between 0.05 and 3.00 mm.

11. The fastening element in accordance with claim 1, wherein
each of the positioning elements has a pressure sensitive adhesive.

12. The fastening element in accordance with claim 1, wherein
each of the positioning elements is configured to be sprayed on.

13. The fastening element in accordance with claim 1, wherein
the holder element has a predominantly hollow-cylindrical shape and forms a first part of the filling passage.

14. The fastening element in accordance with claim 13, wherein
the contact element is a circular disk having a central axis, a second part of the filling passage extending through the central axis and ending at the outlet opening.

15. The fastening element in accordance with claim 9, wherein
each of the positioning elements has a shape which results from two arcs of a circle.

16. The fastening element in accordance with claim 1, wherein the plurality of positioning elements are uniformly distributed around the outlet opening.

* * * * *